US009450812B2

(12) United States Patent
Lee et al.

(10) Patent No.: US 9,450,812 B2
(45) Date of Patent: Sep. 20, 2016

(54) REMOTE SYSTEM CONFIGURATION VIA MODULATED AUDIO

(71) Applicant: Dechnia, LLC, Oklahoma City, OK (US)

(72) Inventors: Mathew S. Lee, Oklahoma City, OK (US); Genu T. Mathew, Oklahoma City, OK (US); Paul F. Beard, Bigfork, MT (US)

(73) Assignee: Dechnia, LLC, Oklahoma City, OK (US)

( * ) Notice: Subject to any disclaimer, the term of this patent is extended or adjusted under 35 U.S.C. 154(b) by 169 days.

(21) Appl. No.: 14/212,624

(22) Filed: Mar. 14, 2014

(65) Prior Publication Data

US 2015/0261415 A1    Sep. 17, 2015

(51) Int. Cl.
*G06F 3/00* (2006.01)
*H04L 12/24* (2006.01)
*H04M 1/215* (2006.01)

(52) U.S. Cl.
CPC ........... *H04L 41/0803* (2013.01); *H04L 41/18* (2013.01); *H04M 1/215* (2013.01)

(58) Field of Classification Search
CPC .......................... H04L 41/0803; H04M 1/215
See application file for complete search history.

(56) References Cited

U.S. PATENT DOCUMENTS

| | | | | |
|---|---|---|---|---|
| 6,006,109 | A * | 12/1999 | Shin | H04W 88/02 455/556.1 |
| 6,061,056 | A | 5/2000 | Menard et al. | |
| 6,513,003 | B1 | 1/2003 | Angell | |
| 6,785,539 | B2 | 8/2004 | Hale et al. | |
| 8,829,365 | B1 * | 9/2014 | Wallace | G06F 13/382 177/25.13 |
| 9,098,865 | B2 * | 8/2015 | Anand | H04B 5/0031 |
| 2005/0049862 | A1 | 3/2005 | Choi et al. | |
| 2006/0019605 | A1 * | 1/2006 | Shau | H04B 5/0006 455/66.1 |
| 2008/0064326 | A1 | 3/2008 | Foster et al. | |
| 2009/0083043 | A1 | 3/2009 | Philippe et al. | |
| 2009/0299750 | A1 | 12/2009 | Yonekubo et al. | |
| 2009/0319260 | A1 | 12/2009 | Kong et al. | |
| 2011/0144778 | A1 * | 6/2011 | Fung | H04B 1/202 700/90 |
| 2011/0289229 | A1 * | 11/2011 | Subramaniam | H04L 41/0806 709/228 |
| 2012/0129453 | A1 | 5/2012 | Seguin et al. | |

(Continued)

FOREIGN PATENT DOCUMENTS

JP    WO2011118018    9/2011

OTHER PUBLICATIONS

Arduino; "Arduino as an FSK Modem"; retrieved on Jun. 5, 2014 from http://sree.cc/electronics/arduino-as-an-fsk-modem.

(Continued)

*Primary Examiner* — Omar Abdul-Ali
(74) *Attorney, Agent, or Firm* — Robert H. Frantz (57) ABSTRACT

The user interface of a mobile computing device is used to configure a target system by establishing a physical connection between a mobile computing device and a target system, such as an audio cable connection between audio jacks of the two or an acoustic coupling through air between a microphones and speakers of the two; establishing an audio or low ultrasonic signal communication session between the two; responsive to the target system entering a configuration mode, prompting a user via the user interface of the mobile computing device to prepare configuration parameter values for the target system; and implementing the configuration parameter values in the target system using the communication session and the physical connection.

18 Claims, 5 Drawing Sheets

(56) References Cited

U.S. PATENT DOCUMENTS

| | | | |
|---|---|---|---|
| 2012/0134238 A1 | 5/2012 | Surprenant et al. | |
| 2012/0179525 A1 | 7/2012 | Seguin et al. | |
| 2012/0214416 A1* | 8/2012 | Kent | H04L 63/18 455/41.2 |
| 2012/0265911 A1* | 10/2012 | Connolly | G06F 13/14 710/300 |
| 2013/0196733 A1 | 8/2013 | Cage et al. | |
| 2014/0075377 A1* | 3/2014 | Kang | G06F 3/04842 715/788 |
| 2014/0088975 A1 | 3/2014 | Davis et al. | |
| 2014/0131442 A1* | 5/2014 | Morrow | G06K 7/0021 235/440 |

OTHER PUBLICATIONS

Arstechnica; "Project HiJack uses iPhone audio jack to make cheap sensors"; retrieved from http://arstechnica.com/apple/2011/01/project-hijack-uses-iphone-audio-jack-to-make-cheap-sensors/.

Perceptivedevelopment; "Tin Can"; retrieved on Jun. 5, 2014 from http://www.perceptdev.com/tincan/.

Wiki; "Hijack"; retrieved on Jun. 5, 2014 from http://www.seeedstudio.com/wiki/Hijack.

Ohscope; "Serial Port and the iPhone with minicom"; retrieved on Jun. 5, 2014 http://www.ohscope.com/2009/02/24/serial-port-on-iphone-with-minicom/.

Stackoverflow; "Using an iPhone audio dongle to transmit data"; retrieved on Jun. 5, 2014 from http://stackoverflow.com/questions/3341280/using-an-iphone-audio-dongle-to-transmit-data.

Projects; "Project HiJack"; retrieved on Jun. 5, 2014 from http://web.eecs.umich.edu/~prabal/projects/hijack/.

VBNews; "Naratte's Zoosh enables NFC with just a speaker and microphone"; retrieved from http://venturebeat.com/2011/06/19/narattes-zoosh-enables-nfc-with-just-a-speaker-and-microphone/.

FPL; "Sending Device"; published on Jan. 30, 2013 by Takara Tomio.

* cited by examiner

REMOTE SYSTEM CONFIGURATION VIA MODULATED AUDIO

FIELD OF THE INVENTION

This invention relates generally to methods and processes for configuring complex systems by a remote device in which the remote device provides a full user interface and the complex system provides a limited user interface.

BACKGROUND OF INVENTION

Many computer-based systems that we encounter in everyday life, in our homes, workplaces and in public, offer a wide array of configuration options. These configurable options may enable and disable certain features, and may provide the system with information it needs to perform its functions. In particular, there is a trend in technology for more and more devices to connect to computer networks, and especially wireless computer networks, such as "Wi-Fi" networks (e.g. Institute of Electrical and Electronic Engineers (IEEE) Wireless Fidelity standard 802.11b). As Wi-Fi has proliferated in offices, homes, factories, and public spaces (retail, parks, hotels, etc.), providers of sophisticated technology equipment have found new and useful added value functions which can be offered when a device is redesigned to include a Wi-Fi interface.

For example, newer "smart televisions" may connect to a wired (Ethernet, etc.) or wireless network. After connecting to a network in a home, the owner can link to the smart TV to use an Apple iPad™, Android-Based™ phone, or other tablet computer to control the TV, to stream content from the controller of the TV for playback on the TV, and to search and find online content such as on-demand movies, Wikimedia sources, and photo and video sharing websites.

In another example, newer computer printers can be configured to access a home or office Wi-Fi network eliminating the need for a wired connection, and allowing remote, wireless printing from any suitably equipped desktop computer, laptop computer, tablet computer, or smart phone with in the same Wi-Fi network. Some newer printers also offer a remote print function wherein, upon registration and configuration, the printer is assigned a unique electronic mail address. Subsequently, any document or attachment sent to the assigned email address from anywhere in the world, will be routed over the Internet to the local Wi-Fi network, and to the printer for automatic, unattended printing of the document or attachment.

Still another example are newer environmental controls, especially smart thermostats and appliance power controllers intended for home use, which also connect to a home Wi-Fi network. These networked environmental controls report data, such as occupancy status, temperature, and power consumption, to a remote server, which then collects data for the user. The user, logging into the server via the Internet from anywhere, can see patterns, and set control parameters, such as thermostat set-back times, and shut off power to appliances which are running unnecessarily and wasting energy.

Yet another example are newer security cameras which integrate into a wireless network, and then make their surveillance images available to a server, where a user can remotely view the data from the cameras.

Conceivably, any piece of equipment in the home or office can benefit in some way from network connectivity, be it a refrigerator, water heater, spa, swimming pool, lighting, printers, air conditioning, heating, alarm system, television, sound system, etc., all of which will require appropriate configuration for network connection.

However, in order to configure any of these devices to access a wired Ethernet or wireless network, several parameters and values must be selected and configured into the device. For example, it may be necessary for the device to "log into" the network by network name (SSID) and using a password or key value. If the network is security protected, the system must be configured to use the appropriate encryption and security protocol, such as Wired Equivalent Privacy (WEP), Wi-Fi Protected Access (WPA), and WPA2, which are defined in IEEE 802.11, 802.11i-2004 & 802.11i-2007 respectively. Network names, passwords and key values may be long, non-intuitive, and may contain a variety of letters and numbers. In some network interface configuration parameters, numeric values may have to be specified to the device, such as an Internet Protocol (IP) address, and perhaps subnet mask values, and even port assignments. And, some systems, such as the printers that respond to an email address, may require inputting an email address value, and potentially a Universal Resource Locator (URL) value for the web server, ports for that server, and corresponding log-in values (user name, password).

Many of these systems, especially the retail, home-use systems, have very limited user interfaces provided on them to save cost and complexity of the device. Because this configuration is typically only performed once upon initial set up of the equipment, users are forced to navigate very small display screens and input values using inefficient key combinations such as up/down arrow keys to scroll through the alphabet to pick just one character, right/left arrow keys to move to the next screen or selectable option, etc. Not only is this a frustrating experience for many users, but it is error prone, leading many consumers to believe their new product is not operating correctly when the problem is actually just an incorrect configuration choice or parameter.

In the recent past, manufacturers have recognized this problem and attempted to solve it by having many new devices power up with a default configuration. Some of the default configuration values may be printed on a label affixed to the unit so that users and change some other equipment in their network (router, firewall, application programs) to match the default conditions of the new piece of equipment. This, however, can pose security risks because hackers can easily guess the default values, and then can access the device without the owner's permission or knowledge.

SUMMARY OF THE INVENTION

The user interface of a mobile computing device is used to configure a target system by establishing a physical connection between a mobile computing device and a target system, such as an audio cable connection between audio jacks of the two or an acoustic coupling through air between a microphones and speakers of the two; establishing an audio or low ultrasonic signal communication session between the two; responsive to the target system entering a configuration mode, prompting a user via the user interface of the mobile computing device to prepare configuration parameter values for the target system; and implementing the configuration parameter values in the target system using the communication session and the physical connection.

BRIEF DESCRIPTION OF THE DRAWINGS

The figures presented herein, when considered in light of this description, form a complete disclosure of one or more embodiments of the invention, wherein like reference numbers in the figures represent similar or same elements or steps.

DETAILED DESCRIPTION OF EMBODIMENT(S) OF THE INVENTION

Problems Recognized

The present inventors have recognized a problem in the art which they believe is as-of-yet unrecognized and unsolved by those skilled in the art regarding providing useful and intuitive user interfaces for network-compatible computer-based systems which have limited, abbreviated or non-existent user interfaces on board.

The present inventors realized that prolific mobile technology, such as tablet computers, laptop computers, and smart phones, have sufficient user interface hardware which exceeds that of the typical, limited user interface on these systems—larger screen, more colors, touch interface, virtual or hardware keyboard, etc. The inventors set out to co-opt these larger and more capable user interfaces to configure these target systems.

The inventors encountered at least three significant problems in their development. First, if the new design or "app" for the tablet computer or smart phone were to try to connect to the target system using a wireless technology such as Wi-Fi or Bluetooth™, then the user would still have to operate the limited user interface on the target system, which creates an opportunity for error and frustration.

Second, many of the most popular mobile electronic devices, such as an Apple iPod™, iPhone™ or iPad™, have no open standard wired connections such as RS-232, may have proprietary wired connections (e.g., Lightning™), or may have no wired connections available at all.

Third, many of these target systems are designed to connect to only one network at a time, so if the mobile device connected to the target device using a Bluetooth™ connection, Wi-Fi connection, or wired connection, then the target device is disabled (or unable) to attempt to connect to the Wi-Fi network of ultimate interest. Thus, the user would have to toggle between configuring the target device while connected to it, then disconnecting from it, testing the Wi-Fi connection that was being configured, and if unsuccessful, reconnecting to the device and repeating the process.

One considered option for the physical connection between the mobile device and the target device was optical transmission technologies. Infrared Data Arrangement (IrDA) is commonly used between remote controls and entertainment equipment such as televisions and home theater components. Many of today's mobile devices do not have IrDA transmitters built into them, and IrDA is a relatively low bandwidth and error prone transmission scheme. The lack of IrDA transmitter might be overcome by modulating the screen on the mobile device, as some screens also produce a small amount of infrared light, but the data rate and error rate issues remain of concern.

The present inventors realized that almost all of these mobile devices have audio interfaces on them, including combinations of microphones, speakers, and mic/headphone jacks. And, many of the non-network compatible target systems already have at least an audio output device, such as a speaker or annunciator, and many have an audio input device as well. For those which are being redesigned to add network compatibility, adding an audio jack (e.g. 3.55 mm jack) for receiving an audio cable, or adding a microphone or speaker is a relatively low cost proposition, which is consistent with design constraints of retail electronics. There are several headphone jack sizes, configurations, and pin-out definitions in use in various mobile systems today, some of which use the same size jack (receptacle) and cable-end plug, but which use different pin-out conventions. Jacks receiving 2.5 mm and 3.5 mm plugs are common on many mobile devices, some with slightly different pin-out definitions. Some electronic audio interface driver devices for use on circuit boards automatically sense the pin-out of a jack or cable, and other embodiments may utilize a fixed pin-out or switchable connection circuit design. The Apple iPhone™, iPad™ and iPod Touch™ have a headphone/microphone connection which is compliant with Japan Electronics and Information Technology Industries Association (JEITA) standard RC5325A. In a preferred embodiment, a target system which is compatible with being configured by a mobile system through an audio cable will automatically detect the pin-out or wire-to-signal assignments of a cable which is plugged into its audio jack. Through some experimentation, the present inventors also found that lower frequencies of ultrasonic signals can also be detected by microphones and produced by speakers of many common mobile devices. Audio is typically considered to extend from the lower few tens of cycles per second (Hertz, Hz) up to 18 or 20 kilohertz (kHz). Lower ultrasonic signals, while imperceptible by most people's hearing, extends up a few more kilohertz, such as to 27 kHz or 28 kHz. The present inventors realized that both communication frequency ranges are suitable and reliable enough for the amount of data to be transferred between the mobile device and the target system being configured, and that the lower ultrasonic signals presented an additional advantage of not confusing the user and being less susceptible to interference by ambient noise.

Through additional experimentation and testing, the present inventors discovered that both wired (cabled) and through-the-air (acoustic) wireless coupling were reliable enough of physical connection (over limited distances) to provide a connection between the mobile device and the target device.

Communication Stack.

Figure 3:
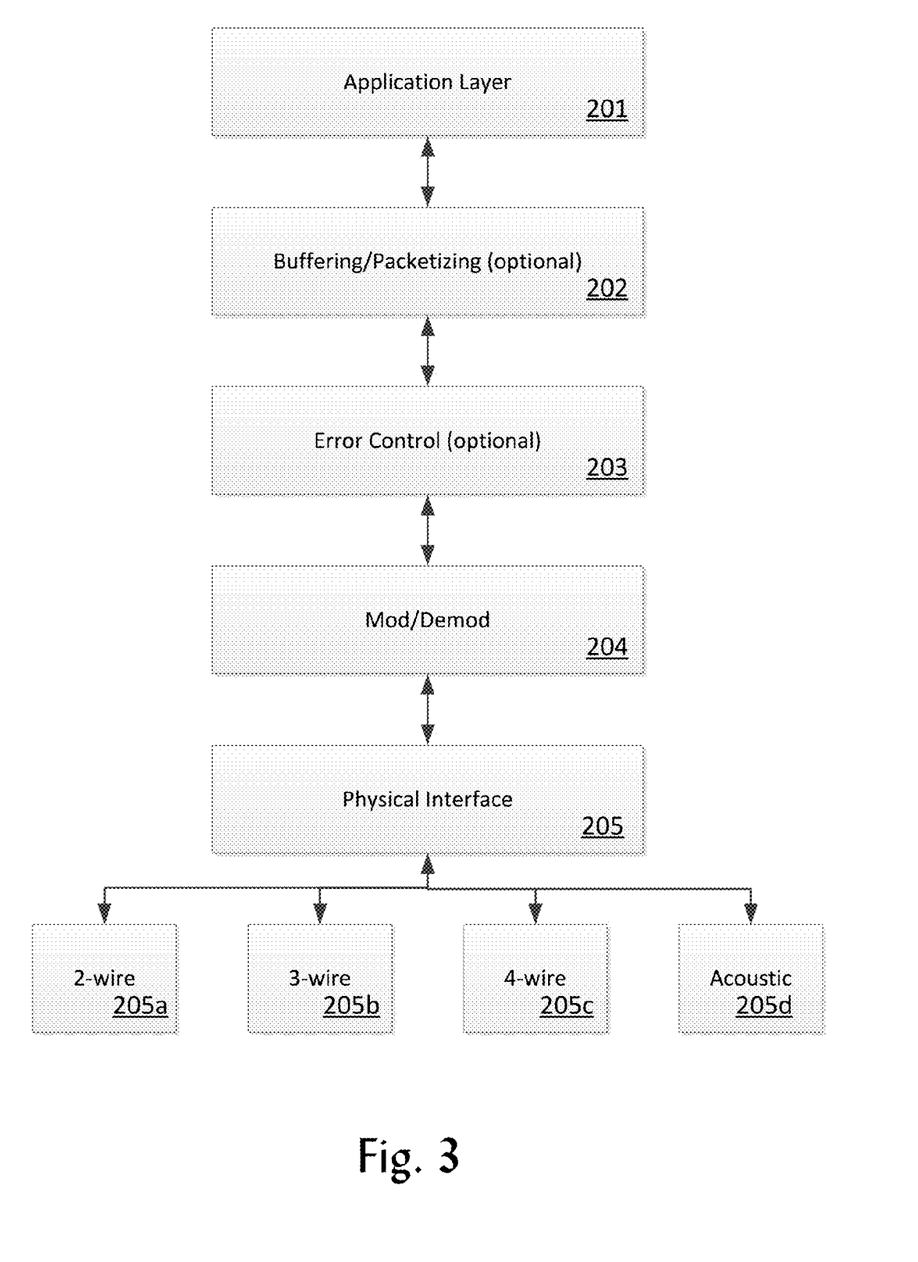
FIG. 3 depicts a protocol stack according to the present invention.

Using the results of these experiments and test, the communication stack shown in FIG. 3 can be realized in certain embodiments of the present invention. The "top" of the stack is the application layer (201) which is the program or programs running on the mobile device, such as an Apple iOS™ application program or Google Andriod™ application program. At this layer, the application program merely makes application programming interface (API) calls to establish a connection with a target device, and to send and receive data to and from the target device.

In the optional buffering and packetizing layer (202), middleware program instructions executed by the processor of the mobile device hold and organize data to be sent to the target device and to be received by the application layer (201). In the optional error control layer (203), typical error detection (Cyclic Redundancy Check, parity bits, etc.) are implemented, and error-free data is exchanged with the buffering layer (202). Erroneous data is re-transmitted or re-received according to a simple handshake protocol of acknowledgement via the modulation/demodulation layer (204).

The mod/demod layer (204) is responsible for modifying an audio or low ultrasonic signal to embed data or recover data from the signal. Amplitude modulation (AM), or the more advanced Quadrature Amplitude Modulation (QAM) which is well known in the modem arts can be employed. Preferably, according to experiments and tests by the present inventors, a form of frequency modulation (FM), and in particular Frequency Shift Keying (FSK), is employed. The FSK modulation can be readily implemented in firmware by simply generating one of two frequency audio (or low ultrasonic) tones, and the FSK demodulation can be implemented in firmware using two bandpass filters.

The physical interface (205) may take the form of one or more cabled connections (205a, 205b, 205c), an acoustic through-the-air wireless coupling (205d), or combinations of these physical interconnection types. A two-wire interface (205a) can be half-duplex (e.g., transmit-only from the mobile device to the target device), or it may be full-duplex (e.g., transmit and received to and from the mobile device and the target device) using current summation signaling. A three-wire interface (205b), which is common on most mobile devices, provides separate wires for microphone signal (e.g. input) and a speaker signal (e.g. output) and a third wire for a common reference. A four-wire interface (205c) is essentially two half-duplex, two-wire interfaces, having a first pair of wires for the microphone and a second pair of wires for the speaker signal.

The acoustic interface (205d) may consist of several embodiments, as well. In one embodiment, both the mobile device and the target device have separate microphones and speakers. In this embodiment, half- and full-duplex transceiving is possible using Frequency Division Multiplexing (FDM), wherein different frequencies are assigned to the target system's transmission than to the mobile system's transmission. This arrangement allows for both systems to be transmitting data simultaneously, albeit on different audio or low ultrasonic frequencies, and receiving on the corresponding frequencies. Selection of the frequency assignments must only consider the precision of the bandpass filters and harmonic cross talk. Or, in other embodiments, a half-duplex communication scheme can be realized. And, in other embodiments, the same physical transducer may be used both as a speaker (acoustic output signal generator) and a microphone (input acoustic signal detector).

Figure 1:
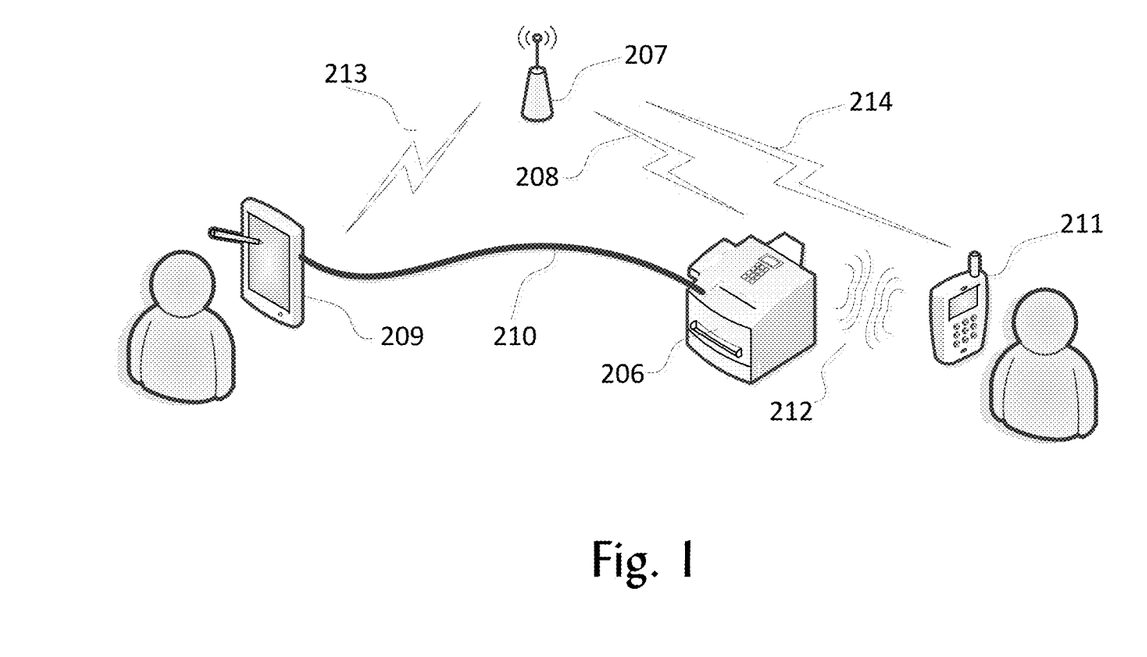
FIG. 1 illustrates an arrangement of components according to the invention employing an audio patch cable or an acoustic through-the-air coupling between a mobile computing device and a target system to be configured via the user interface of the mobile computing device.

Turning to FIG. 1, an arrangement of components according to at least one embodiment of the invention is shown. In this example, a configurable target device (206) is to be set up to communicate (208) with a Wi-Fi access point (207). In a first arrangement, an audio cable (2-, 3-, or 4-wire) is connected from the headphone/mic jack on a mobile device (209), and connected to an audio jack on the target system (206). Then, using an application program and a coordinating logical process on the target system, described in the following paragraphs, the proper configuration options such as network name, security protocol, and password or key are sent from the mobile device (209) to the target system (206).

Because the configuration connection in this arrangement is not actually using the Wi-Fi interface (208) of the target system, the target system can proceed to establish a connection (208) with the access point (207) while the configuration connection remains active. If the connection fails, then the user can simply make adjustments and other trials to re-attempt connection, without having to leave configuration mode of the target device. And, because the Wi-Fi connection (213) of the mobile device (209) is not being used for the configuration operations, the user may access the web to find frequently asked questions (FAQ's), watch demonstration videos, etc., to assist him or her during the configuration process.

Similarly, in another example of arrangement of components, a mobile device (211) can communicate wirelessly via acoustic coupling (212) in the audio or low ultrasonic frequency range to the target system (206). As described in previous paragraphs, the connection can be half- or full-duplex, and may use a microphone/speaker pair or a dual-mode acoustic transducer. Configuration options and parameter values (e.g., network name, security protocol choice, password or key, etc.) are transferred from the mobile device (211) to the target system (206). Other than the connection being an acoustic coupling (212) instead of a wired connection (210) of the previous example, all other functions can be the same, including allowing the target device (206) attempting to connect (208) to the Wi-Fi network, and the Wi-Fi connection (214) of the mobile device (211) being still available for the user to use for normal (non-configuration) functions such as making telephone calls, looking up information on the Internet, etc.

In either of the foregoing examples, an application program on the mobile device provides a combination of one or more of user prompts, menus, radio button lists, slider controls, input fields, and selectable options in order to allow the user to select configuration values to be downloaded to the target device. Such operation may be entirely completed between the mobile device, the target device, and the user.

Figure 2:
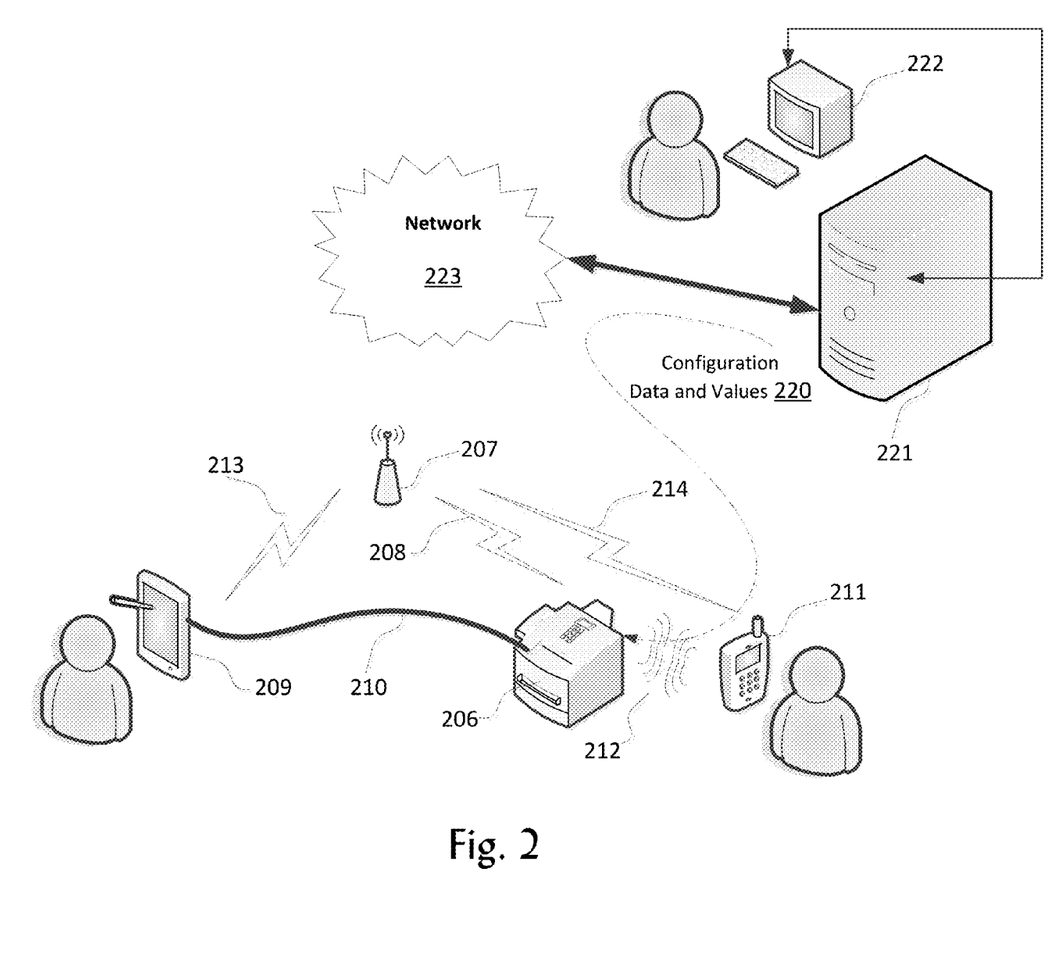
FIG. 2 illustrates another arrangement of components according to the invention in which a server and optionally a remote assistant console are utilized at least in part to create configuration parameters for the target system.

In some other embodiments of the present invention, it may be desirable or necessary to involve a server (221) as shown in FIG. 2 in the configuration process. There are many advantages to this approach. The server may provide the prompts and screens, such as voice prompts, to the user via a mobile device over a network (223) such as the Internet, and intranet, a cellular telephone network, or even over a plain old telephone service (POTS) system. When the server has collected enough information from the user, such as network name, security option, and password or key, it can then format the data and transmit it from the server, over the network (223) to the mobile device (211 or 209), over the configuration connection (212 or 210) to the target system. Again, the target system's Wi-Fi interface (208) is still available during configuration to attempt connection to the access point (207), but in this arrangement, the mobile device does not need to contain an application with the configuration data locally stored, or if it is running an application, it can be a light application sufficient to relay information between the server (221) and the target device.

An additional advantage of this server-enhanced arrangement is that a human assistant can use a terminal (222) to assist or authorize in the configuration process, thereby providing a higher level of support, especially for more complex configuration operations.

Logical Processes According to the Invention.

Figure 4:
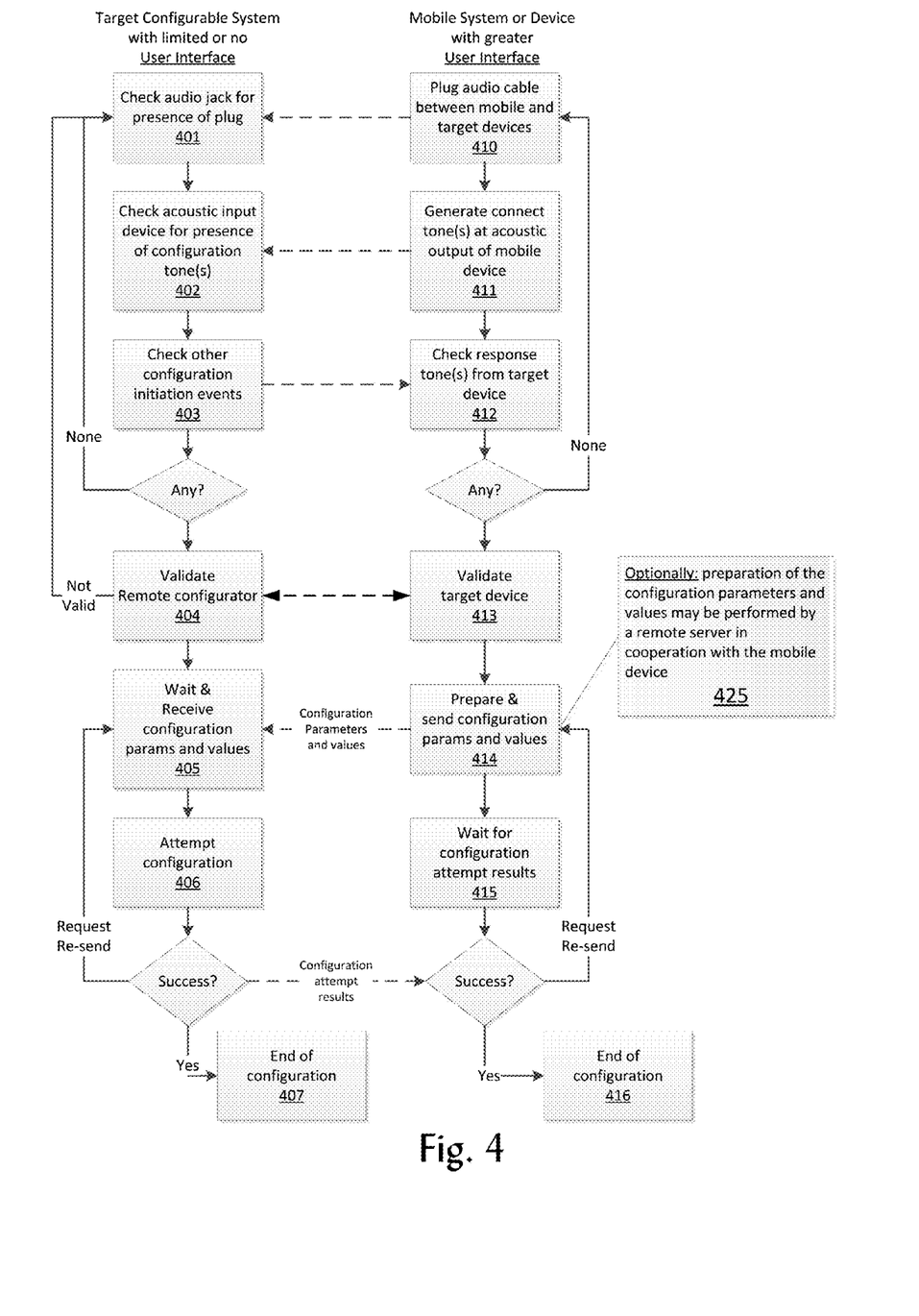
FIG. 4 sets forth example logical processes of a mobile computing device and a target system according to the present invention.

Referring now to FIG. 4, and example set of coordinating logical processes according to the present invention are shown, which are compatible with the foregoing embodiment descriptions. The left column of steps is performed by the target system for configuration, preferably by a processor under software or firmware control. The right column of steps is performed by the mobile system which has a greater or more-capable user interface than the target system, also preferably by a processor under software or firmware control.

The target system monitors one or both of the audio jack (3.55 mm or similar) and the acoustic input device (microphone) for the presence of a cable plug in the jack or the presence of a connection tone (401, 402). Other configuration initiation events, such as the push of a button or the initial powering up of the target system may also suffice to proceed to step 404. Simultaneously, the audio patch cable (3.55 or similar) is installed (410) in the audio jack of the mobile device and the audio jack of the target system, or the user initiates the mobile device to initiate a configuration connection which produces a connection tone at the mobile device's acoustic output device (410, 411). The mobile device waits (412) for a response from the target system before it proceeds.

Upon making the basic connection (physical and mod/demod) through the audio patch cable or the acoustic through-the-air coupling, the target system and the mobile system validate each other (404, 413), such as by exchanging a make, model, and serial number, and optionally a security key. After this validation, the mobile device then prepares (414) the configuration parameters and values in several different manners. For example, in the scenario of configuring a Wi-Fi interface on the target system, the mobile system can initially configure the target's Wi-Fi interface to search for available networks which are broadcasting their network names, and can collect those names from the target system for the user to see and select. Or, if the mobile system has a Wi-Fi interface of its own, it can also scan for network names which are being broadcast. In another approach, such as connecting to a Wi-Fi network which is not broadcasting its name or where the desired network control parameters are already known, the mobile system can prepare the parameters, optionally prompting and collecting choices from the user, by relaying prompts and responses to and from a remote server (425), or automatically without engaging the capabilities of the target system.

When the configuration parameters and values are ready, they are sent (414) to the waiting (405) target system from the mobile device, such as by FSK modulation of the data values in an audio range or low ultrasonic range, and optionally including encryption, packetizing and error detection and correction.

When the target system has received (405) the configuration parameters and values, it attempts (406) to implement the configuration, such as by configuring its Wi-Fi interface and attempting to log into a Wi-Fi network as previously discussed. Meanwhile, the mobile device, and optionally the server, await (415) the results of the configuration attempt.

If the configuration attempt is unsuccessful, then new parameters and values can be prepared and sent (414, 415), optionally based on any error codes returned from the target system, which is repeated until the configuration attempt is successful or the configuration mode is terminated (407, 416) otherwise.

Computer Program Product

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable media having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming languages or a conventional procedural programming language. The program code may execute entirely on one computer, or distributed over multiple computers.

Aspects of the present invention are described herein with reference to process illustrations of methods, apparatus, systems and computer program products according to embodiments of the invention. It will be understood that each block of each process diagram, and that combinations of blocks can be realized by computer program instructions executed by one or more processor. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function or action specified in the flowchart and/or block diagram block or blocks.

Suitable Computing Platform.

The preceding paragraphs have set forth example logical processes according to the present invention, which, when coupled with processing hardware, embody systems according to the present invention, and which, when coupled with tangible, computer readable memory devices, embody computer program products according to the related invention.

Regarding computers for executing the logical processes set forth herein, it will be readily recognized by those skilled in the art that a variety of computers are suitable and will become suitable as memory, processing, and communications capacities of computers and portable devices increases. In such embodiments, the operative invention includes the combination of the programmable computing platform and the programs together. In other embodiments, some or all of the logical processes may be committed to dedicated or specialized electronic circuitry, such as Application Specific Integrated Circuits or programmable logic devices.

Figure 5:
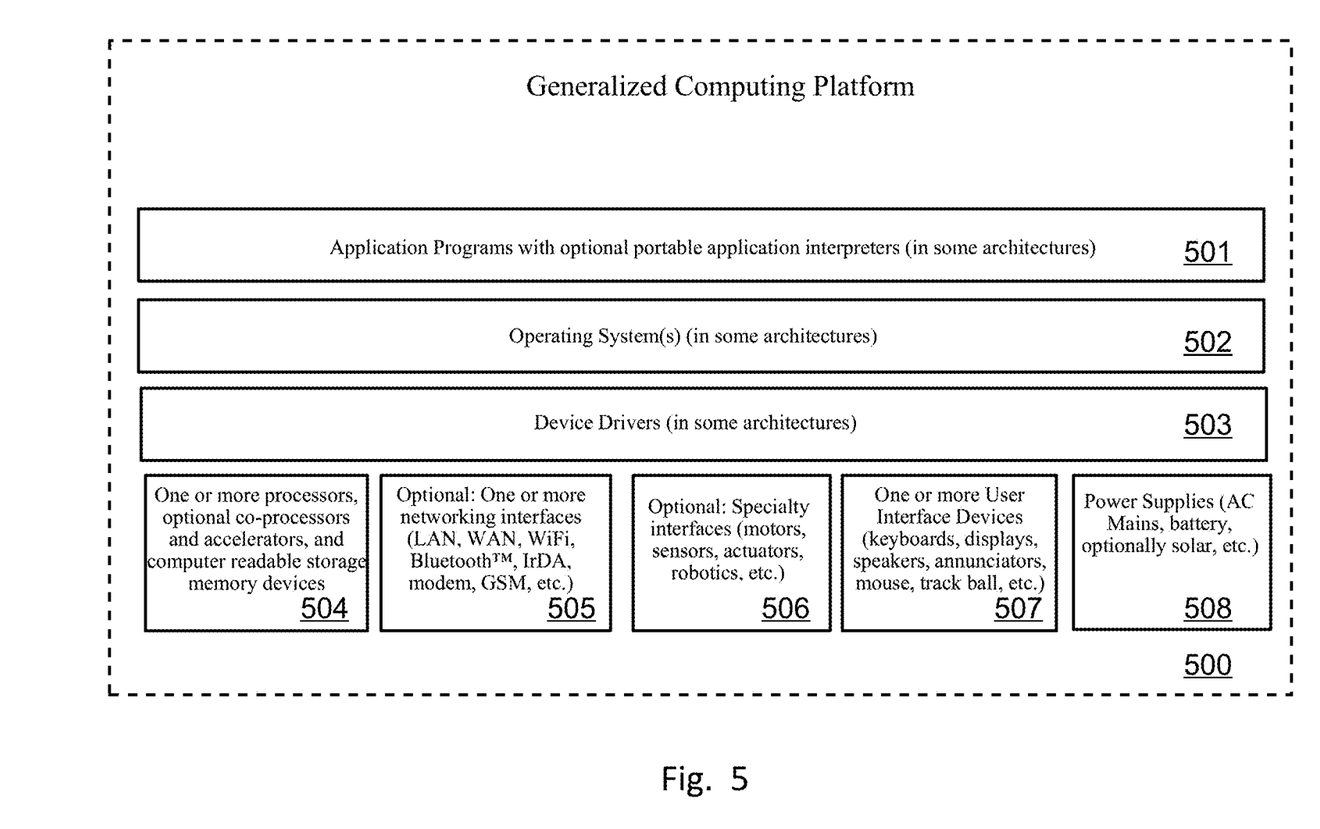
FIG. 5 illustrates a generalized computing platform suitable for combination with program instructions to perform the logical processes shown and described herein.

The present invention may be realized for many different processors used in many different computing platforms. FIG. 5 illustrates a generalized computing platform (500), such as common and well-known computing platforms such as "Personal Computers", web servers such as an IBM iSeries™ server, and portable devices such as personal digital assistants and smart phones, running a popular operating systems (502) such as Microsoft™ Windows™ or IBM™ AIX™, UNIX, LINUX, Google Android™, Apple iOS™, and others, may be employed to execute one or more application programs to accomplish the computerized methods described herein. Whereas these computing platforms and operating systems are well known an openly described in any number of textbooks, websites, and public "open" specifications and recommendations, diagrams and further details of these computing systems in general (without the customized logical processes of the present invention) are readily available to those ordinarily skilled in the art.

Many such computing platforms, but not all, allow for the addition of or installation of application programs (501) which provide specific logical functionality and which allow the computing platform to be specialized in certain manners to perform certain jobs, thus rendering the computing platform into a specialized machine. In some "closed" architectures, this functionality is provided by the manufacturer and may not be modifiable by the end-user.

The "hardware" portion of a computing platform typically includes one or more processors (504) accompanied by, sometimes, specialized co-processors or accelerators, such as graphics accelerators, and by suitable computer readable memory devices (RAM, ROM, disk drives, removable memory cards, etc.). Depending on the computing platform, one or more network interfaces (505) may be provided, as well as specialty interfaces for specific applications. If the computing platform is intended to interact with human users, it is provided with one or more user interface devices (507), such as display(s), keyboards, pointing devices, speakers, etc. And, each computing platform requires one or more power supplies (battery, AC mains, solar, etc.).

CONCLUSION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof, unless specifically stated otherwise.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It should also be recognized by those skilled in the art that certain embodiments utilizing a microprocessor executing a logical process may also be realized through customized electronic circuitry performing the same logical process or processes.

It will be readily recognized by those skilled in the art that the foregoing example embodiments do not define the extent or scope of the present invention, but instead are provided as illustrations of how to make and use at least one embodiment of the invention. The following claims define the extent and scope of at least one invention disclosed herein.

What is claimed is:

1. A method for utilizing a mobile computing device to configure a target system, comprising the steps of:
    continually monitoring by a target system for one or both of the presence of an audio cable connection between an audio jack of a mobile computing device and an audio jack of the target system, and the presence of a connection tone on an acoustic coupling through air between a microphone and speaker pair of the mobile system and a microphone and speaker pair of the target system;
    responsive to detecting one or both of the presence of the cable or the connection tone, automatically establishing a modulation/demodulation communication session between the mobile computing device and the target system via a signal greater than 0 hertz and less than about 28 kilohertz;
    using the communication session, the mobile computing device by the target system validating each other;
    responsive to successful validation, the target system entering a configuration mode;
    automatically preparing one or more configuration parameter values for the target system by the mobile system;

automatically sending the configuration parameter values to the target system; and automatically implementing the configuration parameter values in the target system using the communication session.

2. The method as set forth in claim 1 wherein the steps are completed exclusive of using user interface capabilities of the target system.

3. The method as set forth in claim 1 wherein the establishing a communication session comprises performing frequency shift keying modulation.

4. The method as set forth in claim 1 wherein the preparing of one or more configuration parameter values for the target system is performed at least in part by a server computer system cooperating with the mobile computing device.

5. The method as set forth in claim 1 wherein the configuration parameter values comprise network access configuration parameters.

6. The method as set forth in claim 5 wherein the network access configuration parameters comprise wireless network access parameters.

7. A computer program product for utilizing a mobile computing device to configure a target system comprising:

one or more computer readable, tangible storage memory devices; and program instructions encoded by the one or more computer readable, tangible storage memory devices for causing one or more processors to perform operations comprising:

continually monitoring by a target system for one or both of the presence of an audio cable connection between an audio jack of a mobile computing device and an audio jack of the target system, and the presence of a connection tone on an acoustic coupling through air between a microphone and speaker pair of the mobile system and a microphone and speaker pair of the target system;

responsive to detecting one or both of the presence of the cable or the connection tone, automatically establishing a modulation/demodulation communication session between the mobile computing device and the target system via a signal greater than 0 hertz and less than about 28 kilohertz;

responsive to successful validation, the target system entering a configuration mode;

automatically preparing one or more configuration parameter values for the target system by the mobile system;

automatically sending the configuration parameter values to the target system; and automatically implementing the configuration parameter values in the target system using the communication session.

8. The computer program product as set forth in claim 7 wherein the steps are completed exclusive of using user interface capabilities of the target system.

9. The computer program product as set forth in claim 7 wherein the establishing a communication session comprises performing frequency shift keying modulation.

10. The computer program product as set forth in claim 7 wherein the preparing of one or more configuration parameter values for the target system is performed at least in part by a server computer system cooperating with the mobile computing device.

11. The computer program product as set forth in claim 7 wherein the configuration parameter values comprise network access configuration parameters.

12. The computer program product as set forth in claim 11 wherein the network access configuration parameters comprise wireless network access parameters.

13. A system for utilizing a mobile computing device to configure a target system comprising:

one or more electronic hardware processors;

one or more computer readable, tangible storage memory devices; and program instructions encoded by the one or more computer readable, tangible storage memory devices for causing the one or more electronic hardware processors to perform operations comprising:

continually monitoring by a target system for one or both of the presence of an audio cable connection between an audio jack of a mobile computing device and an audio jack of the target system, and the presence of a connection tone on an acoustic coupling through air between a microphone and speaker pair of the mobile system and a microphone and speaker pair of the target system;

responsive to detecting one or both of the presence of the cable or the connection tone, automatically establishing a modulation/demodulation communication session between the mobile computing device and the target system via a signal greater than 0 hertz and less than about 28 kilohertz;

responsive to successful validation, the target system entering a configuration mode;

automatically preparing one or more configuration parameter values for the target system by the mobile system;

automatically sending the configuration parameter values to the target system; and automatically implementing the configuration parameter values in the target system using the communication session.

14. The system product as set forth in claim 13 wherein the steps are completed exclusive of using user interface capabilities of the target system.

15. The system product as set forth in claim 13 wherein the establishing a communication session comprises performing frequency shift keying modulation.

16. The system product as set forth in claim 13 wherein the preparing of one or more configuration parameter values for the target system is performed at least in part by a server computer system cooperating with the mobile computing device.

17. The system product as set forth in claim 13 wherein the configuration parameter values comprise network access configuration parameters.

18. The system product as set forth in claim 17 wherein the network access configuration parameters comprise wireless network access parameters.

* * * * *